Patented June 7, 1938

2,119,753

UNITED STATES PATENT OFFICE 2,119,753

STABILIZATION OF SICCATIVE SOLUTIONS

John T. Rutherford, Berkeley, and Glenn C. Brock, El Cerrito, Calif., assignors to Standard Oil Company of California, San Francisco, Calif., a corporation of Delaware No Drawing. Application June 11, 1934,
Serial No. 730,171

13 Claims. (Cl. 134—57)

This invention relates to stabilized solutions of metallic naphthenates, linoleates and resinates, and to processes of preparing the same. In particular, it relates to the prevention of sedimentation and gel-formation in solutions of metallic naphthenates, metallic linoleates, metallic resinates and the like siccative agents in petroleum thinners, coal tar derivatives, turpentine and similar volatile solvents, by the addition thereto of small amounts of butyl, amyl and the like alcohols.

As is well known, solutions of cobalt, manganese, zinc and the like salts of naphthenic, linoleic and resinic acids, used as drying agents in paints, varnishes, ink oils, etc., tend to form sediments and gels upon standing. This tendency is increased by the presence of minute amounts of water, often difficult or impossible to remove from the salt prior to solution in the desired solvent; thus a 25% solution of manganese naphthenate in a petroleum thinner will set into a gel in about an hour after its preparation, if an exceedingly small amount of water is present. In this state the solution is difficult to handle and only a temporarily mobile liquid can be obtained by heating, for the gel reappears upon cooling.

The several metallic salts ordinarily used as siccatives differ among themselves in their tendency to form gels upon solution in an organic solvent, but in general it has been found that this tendency decreases in the following order, for a given metallic radical: naphthenate, linoleate, resinate; also, and in general, the tendency decreases in the following order for a given acidic radical: manganese, cobalt, lead.

We have now found that the addition of a small quantity of an alcohol, particularly an alcohol which is soluble in the desired solvent for the siccative and which, although largely water-insoluble, will nevertheless dissolve small amounts of water, will completely eliminate and prevent the formation of the above undesirable sediments and gels. Primary and secondary butyl alcohols and the several amyl alcohols, or mixtures of the same, are the preferred gel- and sediment-preventing agents of our invention, but other higher aliphatic monohydric alcohols, insofar as they are soluble to a sufficient extent in the organic solvent and insofar as they are capable of dissolving small amounts of water, are equivalent thereto. These alcohols, when present in a solution of a metallic naphthenate, linoleate or resinate in an organic solvent, will not only allow storage of the solution for an indefinite period of time, without gel formation or sedimentation, but will also, upon addition to an already gelatinized solution, immediately reduce it to a mobile liquid, without heating, and allow it to remain mobile indefinitely thereafter.

The amounts of the alcohols of our invention necessary to prevent gel formation and sedimentation vary with the particular siccative agent, with the concentration of the solution, and with the presence or absence of small amounts of water, but these amounts are in all cases small. Thus, as noted above, the siccative agent possessing the greatest gelatinizing tendency is manganese naphthenate: from 1.0 to 3.0 per cent of the ordinary mixture of amyl alcohols known to the trade as "amyl alcohol", on the basis of weight percentage of solid drier, will prevent gelatinization in solutions of manganese naphthenate in petroleum thinners and the like solvents. Likewise, from 0.5 to 2.0 per cent by weight of ordinary commercial amyl alcohol, on the basis of solid drier, will prevent the gelatinization of solutions of cobalt naphthenate, which, as noted above, has a somewhat lesser tendency to cause gel formation than does manganese naphthenate. Still lesser amounts of ordinary commercial amyl alcohol will prevent gel formation and sedimentation of cobalt, manganese and lead linoleates and resinates.

For reducing to mobility, an already gelatinized solution of a siccative of this character, we have found that approximately twice the amount of our alcohols are required than are originally required to prevent gel formation; the necessity of using more alcohol after gel formation than before is probably due to the inability to obtain adequate admixture of the alcohol and the gel, and thus complete and homogeneous distribution of the gel-preventing agent. Thus in no case have we found it necessary to add, or have present as much as 10.0 per cent by weight of the alcohol, on the basis of solid siccative.

As a specific example of the practice of our invention and of the character of the compositions obtained by its use:

We dissolved 20 parts by weight of manganese naphthenate in 100 parts by weight of a petroleum thinner by agitating the same at about 250° F., until solution was complete. We then added 0.4 part by weight of ordinary commercial amyl alcohol, agitated to disperse the alcohol uniformly, and allowed the solution to cool. The resulting solution showed no tendency toward gel-formation or sedimentation, even in the presence of water, when stored at low temperatures for long periods of time.

As noted hereinabove, butyl and amyl alcohols, or mixtures of the same, are the preferred gel-preventing agents of our invention. Other higher alcohols, however, insofar as they are sufficiently soluble, in the desired solvent for the siccative, and insofar as they are capable of dissolving small amounts of water, are suitable for the practice of our invention.

In addition to the fact that all tendency toward sedimentation and gel formation is eliminated by incorporating small amounts of these alcohols in the siccative solutions, we may note that the fluidity of solutions which do not actually reach the point of gel formation, is greatly increased, thereby increasing their ease of handling. As a particular feature of our invention, we call attention to the fact that the addition of these alcohols does not cause the acidification of an already neutral siccative, for we have found that for many purposes any free acidity in a siccative or siccative solution is undesirable.

While we have described in detail the character of our invention and given illustrative examples of its practice, we have done so by way of illustration only and with the intention that no limitation should be imposed upon the invention thereby.

We claim:

1. A stabilized metallic siccative soap solution comprising a metallic siccative soap, an organic solvent therefor, and less than 10% by weight, on the basis of solid siccative, of an aliphatic monohydric alcohol having more than three carbon atoms to the molecule, the said alcohol being soluble in the organic solvent and being capable of dissolving small quantities of water.

2. A stabilized metallic siccative soap solution of the class consisting of metallic naphthenates, resinates and linoleates in an organic solvent, stabilized by the presence of an aliphatic monohydric alcohol having more than three carbon atoms to the molecule, the said alcohol being soluble in the organic solvent and being capable of dissolving small quantities of water, the said alcohol being present in amounts not substantially greater than those sufficient to effect the stabilization.

3. A stabilized metallic siccative soap solution consisting of a solution of a metallic siccative soap in an organic solvent, stabilized by the presence of an amyl alcohol in amounts not substantially greater than those sufficient to effect the stabilization.

4. A stabilized metallic siccative soap solution consisting of a solution of a metallic siccative soap in an organic solvent, stabilized by the presence of a butyl alcohol in amounts not substantially greater than those sufficient to effect the stabilization.

5. A process of preparing a stabilized metallic siccative soap solution comprising adding to a solution of a metallic siccative soap of the class consisting of metallic naphthenates, resinates and linoleates in an organic solvent, an aliphatic monohydric alcohol having more than three carbon atoms to the molecule, the said alcohol being soluble in the solvent and being capable of dissolving small quantities of water, the said alcohol being added in amounts not substantially greater than those sufficient to effect the stabilization.

6. A process of preparing a stabilized metallic siccative soap solution comprising adding to a solution of a metallic siccative soap in an organic solvent, less than 10% by weight, on the basis of solid siccative, of an aliphatic monohydric alcohol having more than three carbon atoms to the molecule, the said alcohol being soluble in the organic solvent and being capable of dissolving small quantities of water.

7. A process of preparing a stabilized metallic siccative soap solution comprising adding to a solution of a metallic siccative soap in an organic solvent, less than 10% by weight, on the basis of solid siccative, of an amyl alcohol.

8. A process of preparing a stabilized metallic siccative soap solution comprising adding to a solution of a metallic siccative soap in an organic solvent, less than 10% by weight, on the basis of solid siccative, of a butyl alcohol.

9. A mobile, stabilized siccative metallic naphthenate soap solution consisting of about 20% by weight of a siccative metallic naphthenate, less than 2.0% by weight of an aliphatic monohydric alcohol having more than three carbon atoms to the molecule, the said alcohol being capable of dissolving small quantities of water, the balance being an organic solvent for the siccative metallic naphthenate.

10. A stabilized mobile metallic siccative soap solution comprising a solution of a metallic siccative soap in a petroleum thinner and less than 10% by weight, on the basis of solid metallic siccative soap, of an aliphatic monohydric alcohol having more than three carbon atoms to the molecule, the said alcohol being soluble in the said thinner and being capable of dissolving small quantities of water.

11. A stabilized metallic siccative soap consisting of a metallic siccative soap and less than 10% by weight thereof of an aliphatic monohydric alcohol having more than three carbon atoms to the molecule, the said alcohol being capable of dissolving small quantities of water, the said stabilized metallic siccative soap being completely soluble in hydrocarbon solvents without gel- and sediment-formation.

12. A stabilized metallic siccative soap consisting of a metallic siccative soap and an aliphatic monohydric alcohol having more than three carbon atoms to the molecule, the said alcohol being capable of dissolving small quantities of water and being present in amounts not substantially greater than those sufficient to prevent gel- and sediment-formation upon solution of the stabilized metallic siccative soap in hydrocarbon solvents, the said stabilized metallic siccative soap being completely soluble in hydrocarbon solvents without gel- and sediment-formation.

13. A stabilized metallic siccative soap comprising a metallic siccative soap of the group consisting of siccative metallic naphthenates, resinates and linoleates, and less than 10% by weight thereof of an aliphatic monohydric alcohol having more than three carbon atoms to the molecule, the said alcohol being capable of dissolving small quantities of water, the said stabilized metallic siccative soap being completely soluble in hydrocarbon solvents without gel- and sediment-formation.

JOHN T. RUTHERFORD.
GLENN C. BROCK.